United States Patent [19]
Dams et al.

[11] 3,948,123
[45] Apr. 6, 1976

[54] UPPER SUPPORT FOR TURNING MACHINES

[76] Inventors: Reinhard Dams, Buchholzer Str. 14, 3014 Misburg; Rolf Heineccius, Steinkamp 15, 3015 Wennigsen-Degersen; Alvin Ultwer, Lessingstrasses 12, 3012 Langenhagen, all of Germany

[22] Filed: Dec. 1, 1972

[21] Appl. No.: 311,247

[30] Foreign Application Priority Data
June 22, 1972  Germany.............................. 2230482

[52] U.S. Cl................ 82/24 R; 82/36 A; 82/36 R
[51] Int. Cl............................................ B34b 21/00
[58] Field of Search................ 82/24 R, 36 R, 36 A

[56] References Cited
UNITED STATES PATENTS

| | | | |
|---|---|---|---|
| 1,027,535 | 5/1912 | Fogarty............................... | 82/36 R |
| 1,222,178 | 4/1917 | Browand............................ | 82/36 R |
| 2,621,396 | 12/1952 | Gracchi ............................. | 82/36 A |
| 3,109,336 | 11/1963 | Rozum............................... | 82/36 A |
| 3,408,885 | 11/1968 | Mendenhall ....................... | 82/36 R |

*Primary Examiner*—Leonidas Vlachos

[57] ABSTRACT

This invention relates to a rotatable upper support for turning machines, which has an upstanding turning tool carrier, to which turning tools are interchangeably fastenable and can be changed over at will for normal or overhead turning.

3 Claims, 8 Drawing Figures

UPPER SUPPORT FOR TURNING MACHINES

BACKGROUND OF THE INVENTION

Upper supports are used in medium-weight and heavy turning machines. They serve to mount the turning tools and to absorb the forces transferred from tools, through the upper support and into the machine bed. An upper support always rests on a bottom slide which, in turn, is drivable on a bed carriage in a direction transverse to the machine bed. In order to execute several types of turning with the same upper support, the upper support can be turned with respect to the bottom slide in steps of 90°.

The known rotatable upper supports, however, have the disadvantage that they have no fixed stops for the turning tool. Thus, for example, the upper supports in their normal position are capable of tooling the left shoulder of a workpiece from the right. Now, if it is desired to tool a corresponding right shoulder from the left, then for this purpose the upper support has to be rotated through 180° and thereupon the turning tool carrier with the turning tools mounted thereto has to be changed over. The upper supports in which this is possible have a clamping device for receiving the generally bar-form turning tool carrier, which can be formed, for example, by two parallel plates, which are joined with one another by force clamps. Another possibility for fastening the turning tool carrier includes the use of a horizontal groove arranged laterally in the upper support, in which groove the turning tool carrier is guided and clamped fast. In none of the known rotatable upper supports, however, is there provided a means of securing the turning tool carrier so that the cutting edge of the turning tool can be held at a firmly prescribed and exactly measured point. For this reason in the known upper supports it is always necessary, after a tool change, to remeasure the position of the cutting edge and to readjust it. This means, of course, an undesired expenditure of labor.

On the other hand, neither is it possible to dispense with the use of rotatable upper supports, since when the upper support is arranged for the tooling of a left shoulder, it stands in its own way in the tooling of a right shoulder unless it is turned through 180°.

Underlying the present invention, therefore, is the problem of providing a rotatable upper support whose handling is facilitated and which can be used much more versatilely than was hitherto the case.

SUMMARY OF THE INVENTION

This problem is solved according to the invention by the means that the turning tool carrier is constructed symmetrically to its horizontal mid-plane, which lies at the level of the axis of rotation, and with the carrier having on each of its face sides a similar receiving device for the turning tool. If in a rotation of the upper support through 180°, the turning tool has to be changed over, then the turning tool carrier does not have to be changed over along with it. The turning tool is taken from the one face side of the turning tool carrier and secured to its other face side. Since the turning tool carrier has an exactly defined length and the receiving devices for the turning tool are constructed the same on both face sides, in such a change the blade of the turning tool always passes into a precisely predetermined position, so that no further measuring or setting is required. A similar statement holds, of course, also when the upper support is rotated merely through 90°, in order to execute with it interior turning jobs or surfacing jobs. In each case the cutting edge of the turning tool is in an exactly defined position after a changing operation.

Since both face sides of the turning tool carrier have a receiving device for a turning tool, it is also possible to secure a turning tool simultaneously on both sides, so that in some cases a changing over of the turning tool can be dispensed with.

Since the turning tool carrier is constructed symmetrically to its horizontal mid-plane, a similar statement holds, of course, also for the device for receiving the turning tools. This has the consequence that the cutting edge of the turning tool always lies exactly at the height of the horizontal mid-plane of the turning tool carrier, since the cutting edge in the change from normal to overhead turning always has to stay at the height of the axis of rotation. Due to the symmetrical construction of the turning tool carrier, the fastening device on the turning tool and the face sides of the turning tool carrier, the transfer of forces from the cutting edge to the turning tool carrier is substantially direct and unaltered so that neither of the two turning processes — namely, normal and overhead — is disadvantaged with respect to the other.

An especially preferred form of execution of the upper support according to the invention is distinguished in that the turning tool carrier is shiftable in the direction of its longitudinal axis by exactly fixed sections. Thereby it becomes possible also to execute deeper inside turning jobs and plunge-cutting operations. There remain preserved here the essential advantages of the invention, namely, the blade of the turning tool, even after a change, is always in an exactly defined position, since the turning tool carrier is shiftable only by the exactly fixed sections.

In this connection, a form of execution of the upper support is especially expedient in which the turning tool carrier has a series of grooves executed in hardened steel, by the spacing of which it is shiftable and into which there engages for the positional adjustment, a disk trimmed on one side and secured to a shaft running parallel to the turning tool carrier.

In a preferred form of execution of the upper support, the fastening of the turning tool carrier in the upper support is accomplished by the turning tool carrier having its upper and lower sides beveled in opposite direction and arranged in the manner of a swallowtail joint in a recess of the upper support, in which arrangement it is clamped securely from above, over a beveled clamping strip which is drawn by force clamps into the recess. This type of fastening is extremely secure and requires no adjusting of any kind. A shifting of the turning tool carrier, therefore, can be carried out rapidly and conveniently.

In an especially expedient form of the upper support according to the invention the turning tool is fastened in the manner of a bayonet connection to the face side of the turning tool carrier, in which arrangement two insertable closure plates of the bayonet lock type serve simultaneously as shaving guide plates for the turning tool. This type of mounting of the turning tool on the turning tool carrier has the advantages that the turning tool changing can proceed extremely rapidly and that as a direct consequence of the construction of a bayonet lock, the forces absorbed by the cutting edge of the turning tool can be introduced directly into the turning tool carrier, without having the security screws, that ordinarily are still present for the securing of the bayonet lock, subjected to any substantial load either in normal turning or in overhead turning.

A further advantageous embodiment of the upper support according to the invention is distinguished in that the turning tool carrier is interchangeable for a modified turning tool carrier which has a receiving device for standardized turning tools. Such a device can be realized in a simple manner by providing a modified turning tool carrier that has a horizontally-extending lateral guide channel with a rectangular cross section, in which standardized turning tools can be installed and held by means of clamping screws. By this simple reequipping, the versatility of the new-type upper support is further increased.

Another improvement in the utility of the upper support according to the invention is yielded in an expedient form of execution by the means that the turning tool carrier is interchangeable for a tool carrier which has a clamping device for the reception of a tube, on the end of which there is a drill head or a turning tool for the execution of inside turning operations. It is thereby possible, using a turning machine which is equipped with this form of embodiment of the rotatable upper support, to carry out in addition to the turning operations already described, also drilling operations, for example, according to the horizontal deep drilling process or inside turning operations with relatively great working depth, which occur, for example, in the inside tooling of drill rods.

BRIEF DESCRIPTION OF THE DRAWINGS

An example of embodiment of the invention is represented in the drawings and is described in detail in the following.

DESCRIPTION OF THE PREFERRED EMBODIMENT

Figure 1:
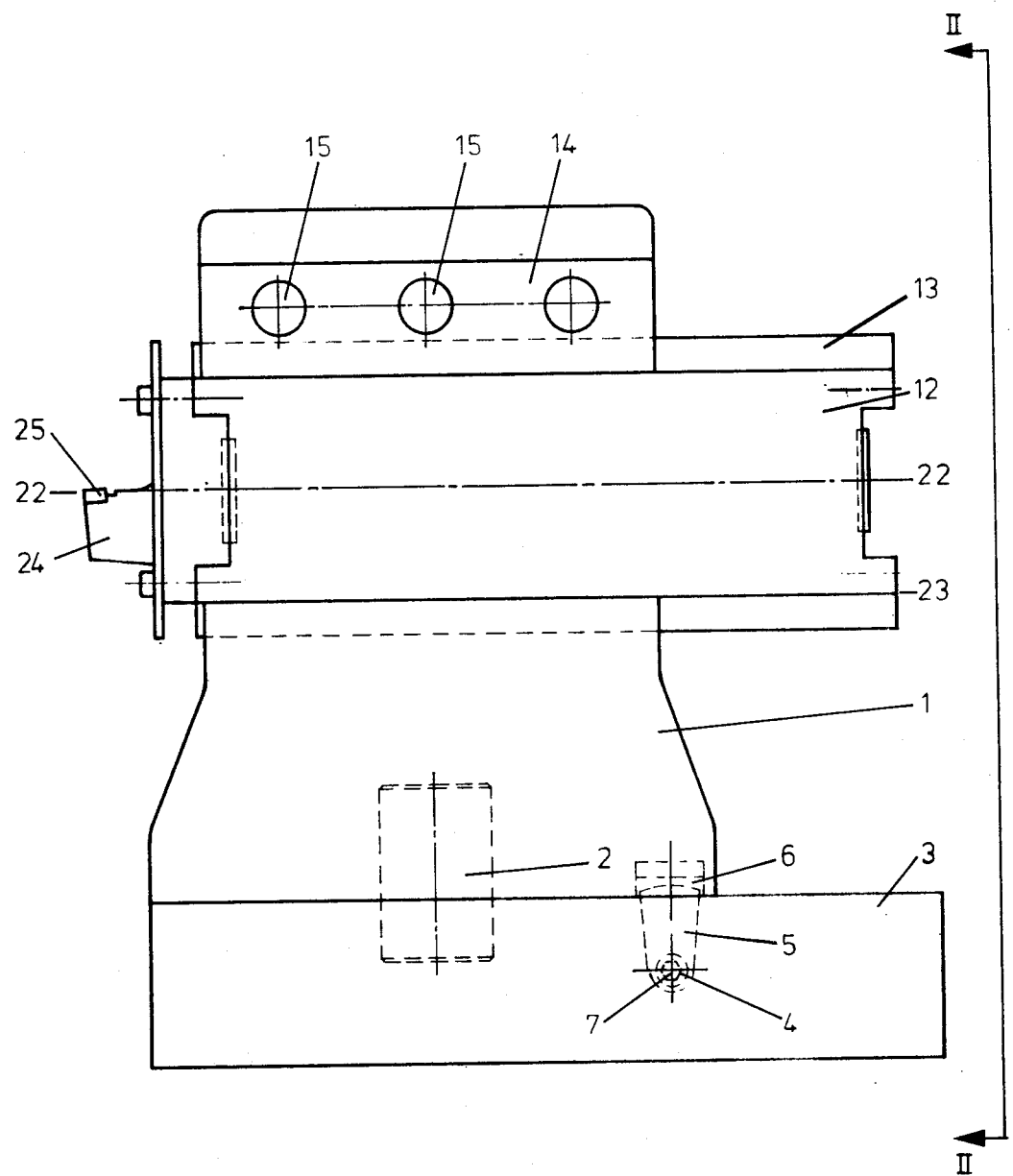
FIG. 1 shows the side view of an upper support according to the invention.
Figure 2:
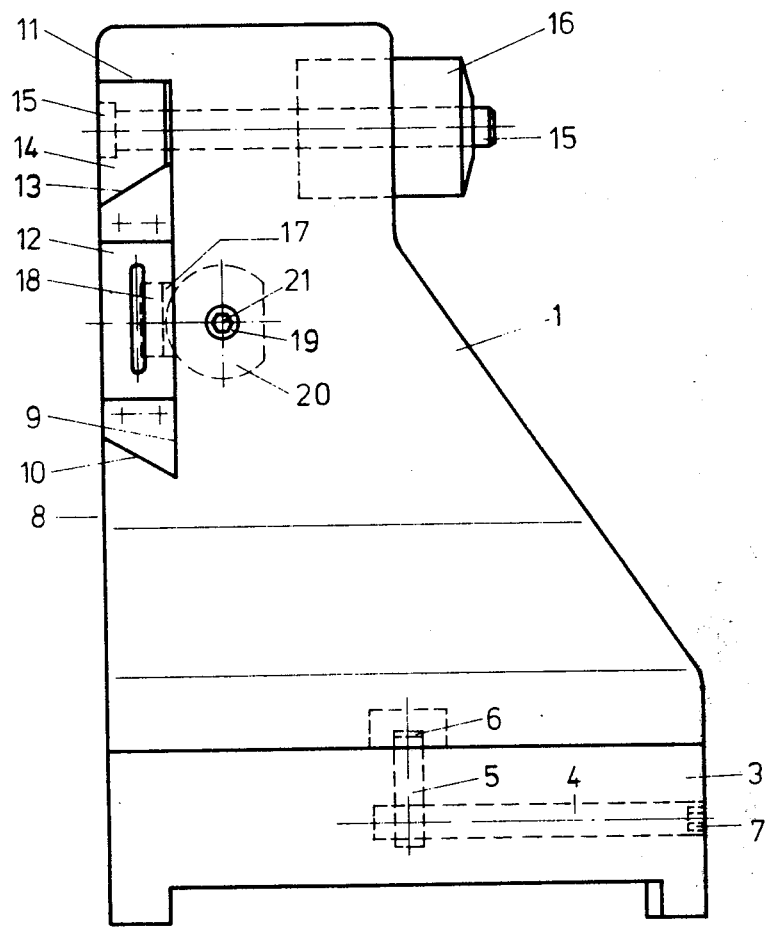
FIG. 2 shows the side view II–II of the upper support according to FIG. 1.
Figure 3:
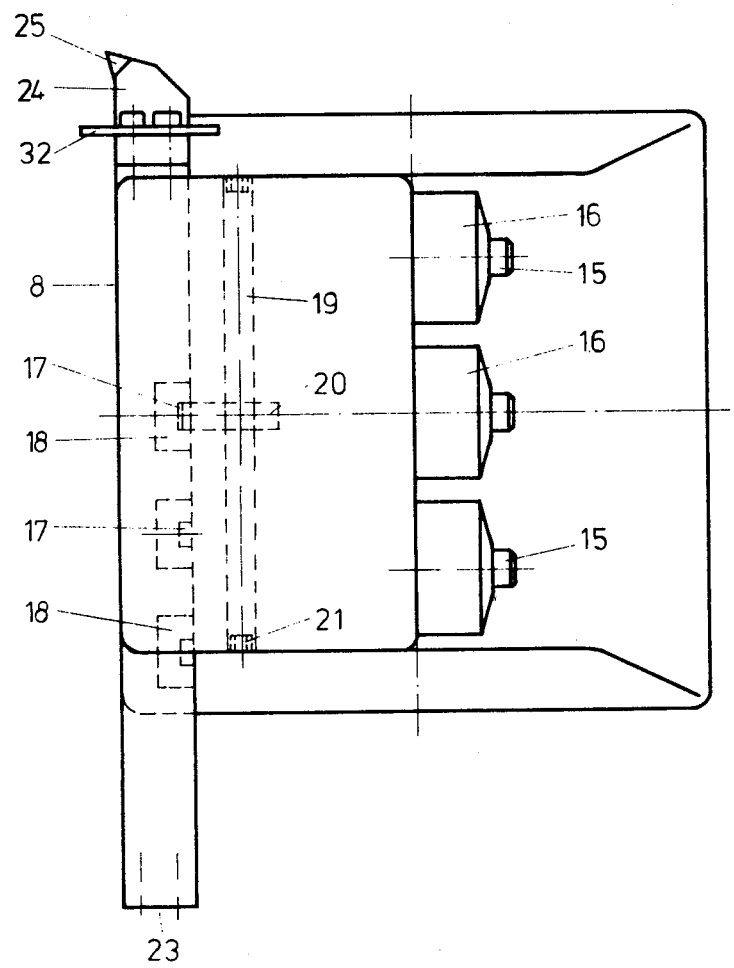
FIG. 3 shows a plan view of the upper support according to FIG. 1.

FIGS. 1 to 3 shows an upper support 1, which is rotatably carried on a bottom slide 3 about a pivot 2. The bottom slide 3 on its part is carried on a carriage bed (not shown) and is movable thereon transversely of the bed of the turning machine. The upper support can be turned through 90° increments with respect to the bottom slide. In these four possible working positions the upper support is held in each position by means of a lug 5, which is fastened to a shaft 4 guided in the bottom slide 3, and through turning of this shaft, can be brought into locking entry with a recess 6, which is provided in a registering position in the upper support 1. For turning the shaft 4, it is equipped with a recessed hexagonal socket 7.

The upper support 1 has a flat side surface 8 and in it an elongated recess 9 extending over the entire width of the upper support, the lower boundary of the recess formed by a bevel 10 inclined downward and inward and the upper boundary 11 of which runs horizontally. In this recess there is guided a slender, upstanding turning tool carrier 12, which has a lower bevel which matingly fits into the corresponding lower bevel of the recess 9, as well as an upper bevel 13, which extends in mirror image symmetry relative to the lower bevel. The turning tool carrier 12 is secured in the recess 9 of the upper support 1 by a clamping strip 14, which has a lower bevel supplementary to the bevel 13 and is drawn inwardly by means of three screws bolts 15 and force clamping nuts 16 into recess 9 so as to rigidly secure the turning tool carrier 12. When the turning tool carrier is secured, then the flat outsides of the turning tool carrier as well as of the clamping strip align with the flat side surface 8 of the upper support 1.

The elongated turning tool carrier 12 can be shifted along its length in exactly fixed increments. For this there are installed in the turning tool carrier 12 a series of spaced blocks 18 of hardened steel, each having a groove 17 accurately fitted true to measure, whose opening faces the upper support. Parallel to the turning tool carrier, in the upper support, there extends a shaft 19 which carries at the center thereof a disk 20 trimmed on one side, which by turning the shaft 19 can be brought into engagement with a groove 17 sitatued at the same height and thereby exactly secure the turning tool carrier 12 in position. This fulfills an important precondition for the use of numerical control. The shaft 19 is operated in the same manner as the shaft 4 in the lower support by means of a wrench which engages the hexagonal recess 21 in the shaft 19. Expediently both shaft have the same size hexagonal recess.

The turning tool carrier 12 is constructed symmetrically with respect to its horizontal mid-plane 22 and has on both its face sides 23 means for receiving a turning tool 24. The turning tools, similarly, have a symmetrically constructed fastening device, and the cutting edge of the cutting plate 25 of the turning tool 24 is positioned exactly at the height of the mid-plane 22 of the turning tool carrier 12, so that the mid-plane 22 lies exactly at the level of the axis of rotation. In FIG. 1 the turning tool is mounted in such a way that it can be used for normal turning. By reason of the symmetrical construction of turning tool and turning tool carrier it is possible by simply changing over the turning tool 25, to also do overhead turning with the same tool.

Figure 4:
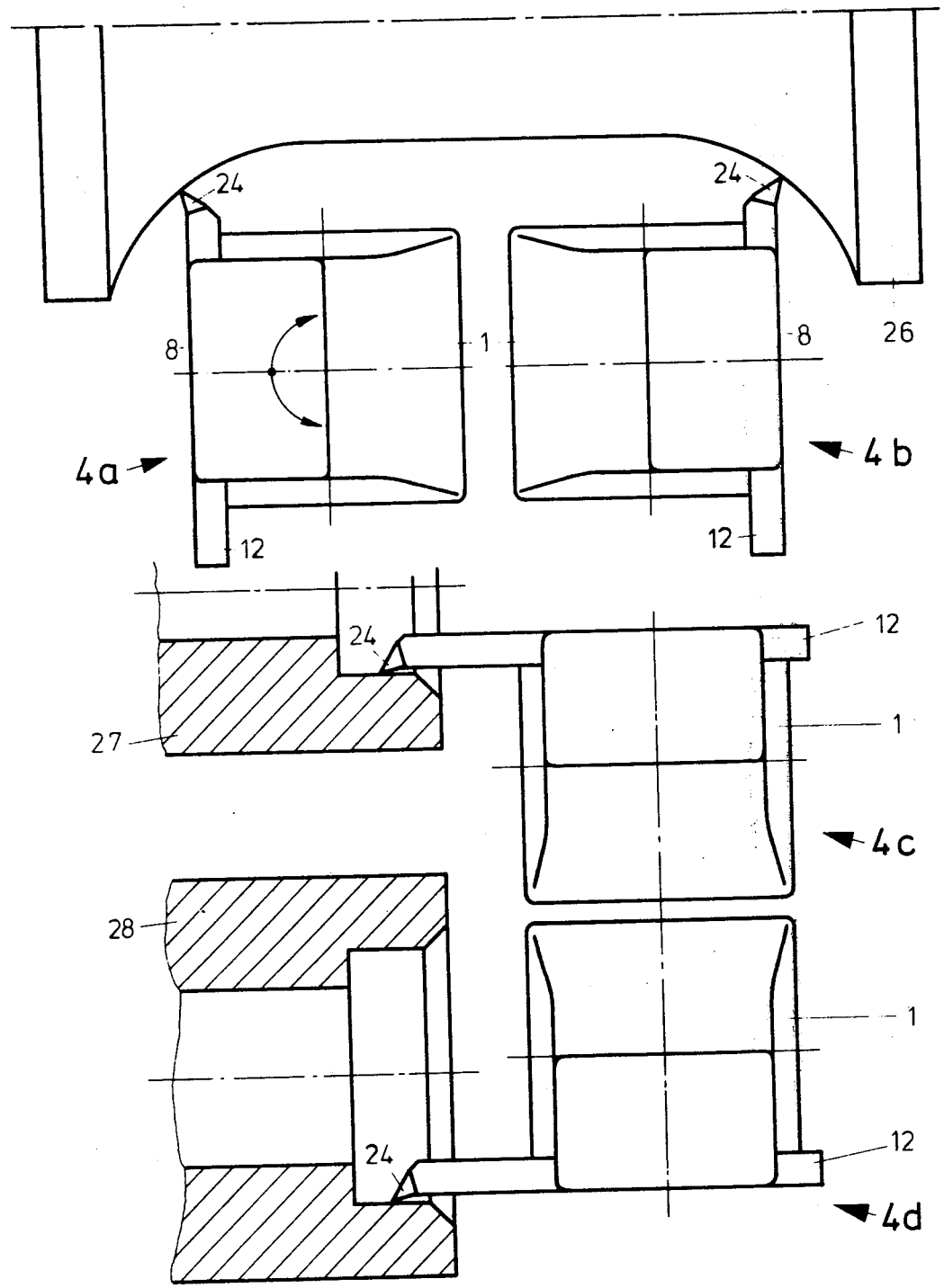
FIG. 4 presents a schematic representation of the various tupes of turning feasible with the upper support according to the invention without change of the tool.

FIG. 4 shows, in schematic representation, the various types of turning which can be executed using the upper support of this invention, without changing the turning tool or the turning tool carrier, but by merely changing it over. With the support in the position shown in FIG. 4a there can be carried out outside turning operations normally and overhead, including conical turning and flat turning (surfacing), to the left. The latter is favored by the feature that the upper support 1 has a flat face side 8. By rotating the upper support through 180° and changing over the turning tool 24 from the one side of the turning tool carrier 12 to the other one arrives at position 4b, in which the operations on workpiece 26 corresponding to position 4a can be executed to the right.

From position 4b one arrives at position 4c by rotating the upper support through 90°, shifting the turning tool carrier in the direction toward the workpiece as well as changing over the turning tool 24 at the one face surface of the turning tool carrier 12, so that in position 4c overhead turning is done, when in position 4b normal turning is done, and conversely. The same inside turning operations as in position 4c can also be carried out in another position 4d, at which one arrives from position 4a by rotating the upper support to the left through 90° as well as shifting the turning tool carrier 12 in the direction of the workpiece 28. For inside turning operations this proves especially favorable in that the turning tool carrier 12 has a cross section that is not greater than the cross section of the turning tool 24, so that the inside diameter to be tooled is limited only by the size of the turning tool.

The slender shape of the turning tool carrier 12 has a favorable effect in performing plunge-cutting operations for which, to be sure, another turning tool must be substituted for the one used in the turning operations described in FIG. 4. The maximum plunge-cutting depth depends in each case on the length of the turning tool carrier.

The universality of the upper support of this invention is shown especially where for the turning operations described with reference to FIG. 4, in the past there would have been needed at least two upper supports and two or three tools, while now such operations are possible with one upper support and, with the exception of plunge-cutting operations, with one tool.

Figure 5:
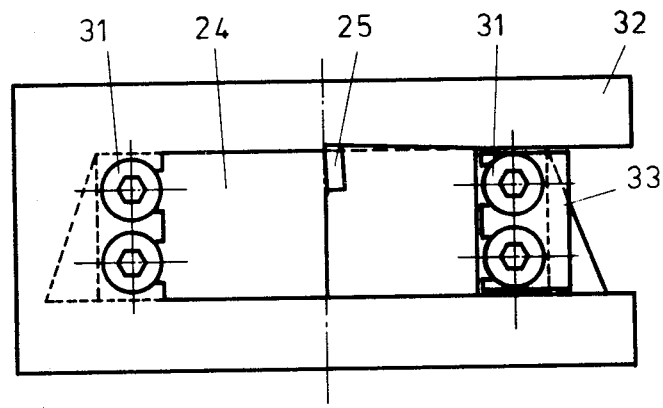
FIG. 5 shows the front view of a turning tool mounted on the face side of the turning tool carrier.
Figure 6:
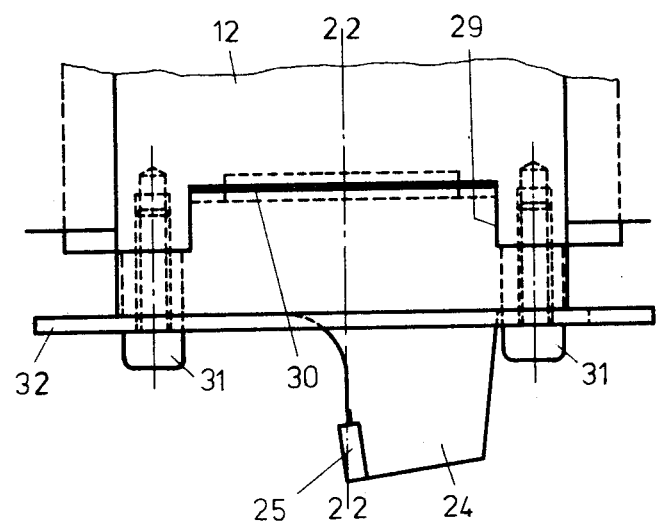
FIG. 6 shows the side view of the turning tool mounted on the face side of the turning tool carrier.

FIGS. 5 and 6 show in detail how the turning tool 24 is constructed and fastened to the face side 23 of the turning tool carrier 12. This turning tool carrier has on its face side, a recess 29 for receiving the mating back 30 of the turning tool 24. The fastening is accomplished with four screws 31, whose heads have hexagonal recesses and which are backed with plug plates 32 and 33. These plug plates are mounted from the upper and lower edges respectively, of the turning tool carrier. One of the plug plates 32 is constructed in U-shape and forms with its shanks the lateral boundary of the turning tool. The other plug plate 33 is situated between the shanks of the plug plate 32. The plug plates thus exercise a double function, namely, serving on the one hand, as plug or closure plate of the bayonet-type connection of turning tool and turning tool carrier and on the other hand, they act simultaneously as shaving guide plate. The blade of the cutting plate 25 is arranged in such a way that it lies, exactly, at the height of the mid-plane 22 of the turning tool carrier 12. It thereby becomes possible my simply changing over the turning tool 24 to go over from normal turning to overhead turning. Furthermore, with this type of connection between turning tool and turning tool carrier there is providea a direct transfer of the forces, arising from the turning at the blade of the cutting plate 25, to the turning tool carrier. Due to the symmetrical construction, these relations do not change, when changing over from normal to overhead turning. In both cases the security screws 31 are subjected to little, if any, load.

Figure 7:
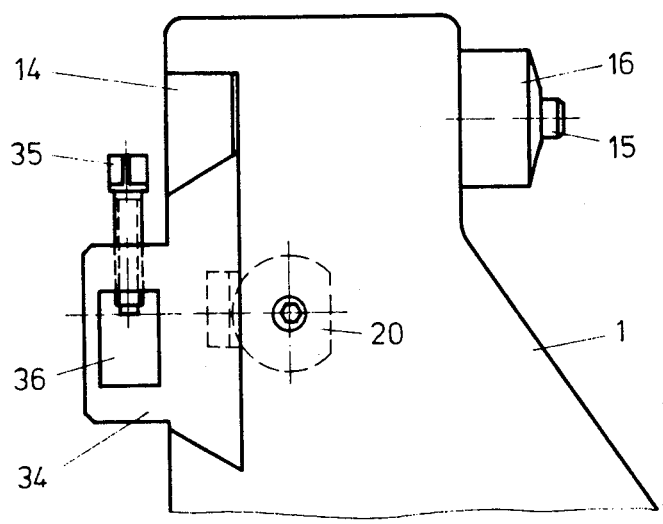
FIG. 7 shows the side view of an upper support with a turning tool carrier for the reception of standardized turning tools.

FIG. 7 shows the side view of the upper support 1, in which the turning tool carrier 12 is changed for another turning tool carrier 34, which is capable of receiving standardized turning tools. For this the turning tool carrier 34 has a horizontally extending guide channel 36 into which the standardized turning tool can be inserted and fastened by a series of clamping screws 35. With this additional carrier use of the upper support of this invention is not limited to the use of the special turning tools 24.

Figure 8:
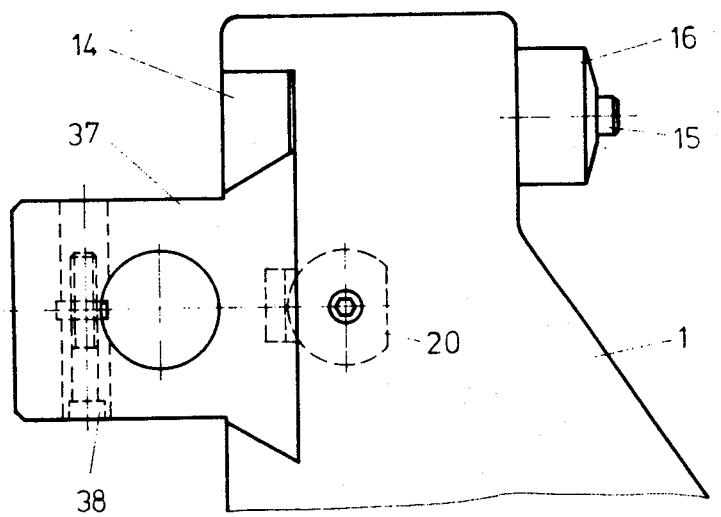
FIG. 8 shows an upper support with a tool carrier for the reception of a borehole tube.

FIG. 8 shows a view of the upper support 1 which, instead of the turning tool carrier 12, now carries a tool carrier 37 which is adapted to receive the borehole tube. This is guided horizontally in the tool carrier 37 and clamped in place by means of clamping screws 38. Through this simple re-equipping of the upper support 1, it is possible to carry out on the turning machine also drilling operations, for example, according to the horizontal deep-drilling process.

Another operation which can be performed with the aid of the tool carrier 37 is inside turning to relatively great working depths as, for example, the inside turning operations on drill rods. For this it is merely necessary to place a commercial-type rotary head on a corresponding tube clamped in the tool carrier 37.

What is claimed and desired to be secured by Letters Patent of the United States is:

1. A rotatable upper support for horizontal turning meachines, which has an upstanding turning tool carrier with turning tools interchangeably fastenable thereto, said tools adapted to be changed over at will for normal or overhead turning, wherein the improvement comprises said turning tool carrier (12) being constructed symmetrically about its horizontal midplane (22) which is arranged to lie at the height of the axis of rotation and having on each of its face sides (23) means for mounting the turning tool (24), and means are provided for shifting the turning tool carrier (12) in the direction of its longitudinal axis in exactly fixed increments with said turning tool carrier (12) including a plurality of hardened steel block means each having grooves (17) therein, the spacing of said grooves permitting shifting of the carrier (17) and there being provided a shaft (19) running parallel to the turning tool carrier and a rotatable disk (20) trimmed on one side and fastened to said shaft for rotatable engagement with said grooves for positionally adjusting said carrier.

2. An upper support according to claim 1 wherein a modified turning tool carrier (34) which has means (36) for receiving standardized turning tools is interchangeable with the turning tool carrier (12).

3. A rotatable upper support for horizontal turning machines, which has an upstanding turning tool carrier with turning tools interchangeably fastenable thereto, said tools adapted to be changed over at will for normal or overhead turning, wherein the improvement comprises said turning tool carrier (12) being constructed symmetrically about its horizontal mid-plane (22) which is arranged to lie at the height of the axis of rotation and having on each of its face sides (23) means for mounting the turning tool (24), in the manner of a bayonet connection to the face side (23) of the turning tool carrier (12) and said mounting means including two insertable closure plates (32 and 33) of the bayonet lock to serve simultaneously as shaving guide places for the turning tool.

\* \* \* \* \*